United States Patent [19]

Wang

[11] Patent Number: 5,168,797

[45] Date of Patent: Dec. 8, 1992

[54] RECIPROCALLY VACUUMIZED AND PRESSURIZED MULTI-PURPOSE FOOD PROCESSING APPARATUS

[76] Inventor: Yiu-Te Wang, No. 65, Alley 1, Lane 230, Chung Cheng Rd., Ta Lin Chen, Chiayi Hsien, Taiwan

[21] Appl. No.: 881,207

[22] Filed: May 11, 1992

[51] Int. Cl.⁵ ............................................. A47J 37/12
[52] U.S. Cl. ..................................... 99/342; 99/330;
99/348; 99/403; 99/409; 99/410; 99/472
[58] Field of Search .......... 99/330, 342, 348, 403–405, 99/407–411, 416, 417, 426, 427, 472; 426/519, 520, 523, 438; 366/226, 234

[56] References Cited

U.S. PATENT DOCUMENTS

| | | | |
|---|---|---|---|
| 940,557 | 11/1909 | Roe | 99/409 |
| 2,027,146 | 1/1936 | Bly et al. | 99/409 |
| 2,302,138 | 11/1942 | Nicholson | 99/472 |
| 3,396,656 | 8/1968 | Forkner | 99/472 |
| 3,434,410 | 3/1969 | Galle | 99/472 |
| 3,690,246 | 9/1972 | Guthrie, Sr. | 99/410 |
| 3,718,485 | 2/1973 | Lankford | 99/403 |
| 4,331,691 | 5/1982 | Poovaiah et al. | 99/342 |
| 4,798,939 | 1/1989 | Nett | 99/403 |
| 4,873,920 | 10/1989 | Yang | 99/330 |
| 4,901,633 | 2/1990 | De Longhi | 99/348 |

FOREIGN PATENT DOCUMENTS 50340  11/1909  Switzerland ............... 99/409

Primary Examiner—Timothy F. Simone
Attorney, Agent, or Firm—Bacon & Thomas

[57] ABSTRACT

A reciprocally vacuumized and pressurized multipurpose food processing apparatus provided with a meshy basket in which all kinds of to-be-processed food can be received and that is plunged into the oil or other kinds of special fluid received in a frying pan for soakage or blanching especially applied to green vegetables or fruits; during the process a reciprocally applied pressure and vacuum are exerted thereto so as to make the soakage process faster and better; and in the meanwhile, the meshy basket can be moved in an up and down manner by a pneumatically operated cylinder and can be continually rotated in one direction for stirring purpose via a motor, making the soakage even. The soaked food is then fried with oil with the meshy basket moved up and down and turned continually under a vacuum state; afterward, the fried food is reciprocally subject to a pressure and vacuum state and de-oiled via a centrifuge.

3 Claims, 3 Drawing Sheets

RECIPROCALLY VACUUMIZED AND PRESSURIZED MULTI-PURPOSE FOOD PROCESSING APPARATUS

BACKGROUND OF THE INVENTION

The present invention relates to a reciprocally vacuumized and pressurized food processing apparatus which is particularly adapted for preparing dried roast meats and processed meat products of the like, and all kinds of deeply boiled food stewed in gravy, and preserves of various sorts and dried fried vegetables and fruits in one aspect; and also adapted for preparing food which is processed with additives or must be soaked in advance in another aspect.

Generally, the available processed food of many kinds, including foods preserved with gravy, sold on the market must be boiled, soaked and de-oiled before packing. The soaking process is conventionally taken in a natural manner with the food plunged directly in the specially seasoned juice or gravy. This kind of process is time consuming and not very effective in making the processed food completely soaked. For instance, it takes about 18 hours to make some vegetables and the pineapples effectively soaked; and it even takes more than 10 days to soak the fruit of various kinds in producing preserves; and the preserves can easily go bad, provided no refrigeration equipment is available, in the soaking process because the added fructose becomes easily soured in such a long time by bacteria propagating in the soaking juice. In case the soaking process is carried out in a refrigerated place, the low temperature will render the soakage ineffective and make the process longer. Moreover, the residual soaking juice is not easily removed by a centrifuge. In a conventional frying process, the skins of the processed food are scorched frequently because the frying oil does not easily penetrate the skins of the processed food, causing the inner thereof rare but the skins scorched in one aspect, and the processed food is not well de-oiled in another aspect.

The present inventor has noticed the above cited problems and comes up with a novel reciprocally vacuumized and pressurized multi-purpose food processing apparatus which is equipped with a frying pan encompassed by an external covering with a space defined therebetween so as to permit steam to circulate therein for heating of the frying pan, and with a messy basket in which is received the to-be processed food and that is driven by a motor and a pneumatically operated cylinder so that the messy basket can be moved up and down and spinned continually in one particular direction; and a number of infusing and a recollection duct are in communication with the frying pan so that different kinds of fluid can be infused into the frying pan for soaking, blanching, and frying the food received in the meshy basket and also be discharged into a number of reservoirs; and an air drawing duct and a pressure exerting duct are coupled to the frying pan so as to reciprocally subject the frying pan to a pressurized and vacuumized state, making the soaking and frying process faster and more efficient; and a centrifuge is also provided so as to remove the soaking, blanching and frying fluids or oil adhering on the processed food.

SUMMARY OF THE PRESENT INVENTION

Therefore, the primary object of the present invention is to provide an automatically operated food processing apparatus which can be infused with various kinds of fluid for processing food received therein with the apparatus reciprocally subjected to a pressure and a vacuum state and the processed food moved up and down and turned in one particular direction in a meshy basket at the same time; and the temperature of the apparatus can be automatically controlled and the processed food can be dehydrated or de-oiled by a centrifuge.

Another object of the present invention is to provide a multi-purpose food processing apparatus which can be reciprocally subjected to a pressure and a vacuum state with the processed food received in a meshy basket constantly moved up and down and spinned in a particular direction and the temperature of the apparatus accordingly varied so as to improve the quality of soakage of the food and make the time of processing thereof fascinatingly short, preventing the added fructose from going soured as a result of the fast propagation of bacteria therein so that the food is able to be processed in a more hygienically manner and the quality thereof is greatly improved.

One further object of the present invention is to provide a multi-purpose food processing apparatus which is able to make the processed food de-oiled in a condition in which a pressure and a vacuum state are reciprocally applied so that food can be processed with the oil containing thereof met an internationally accepted standard set for a healthy processed food.

BRIEF DESCRIPTION OF THE DRAWINGS

To make the features, operational modes, and the structure of the present invention better understood by people having ordinary skill in the art, a number of illustrative drawings are presented in company with a couple of preferred embodiments, in which.

DETAILED DESCRIPTION OF THE PREFERRED EMBODIMENTS

Figure 1:
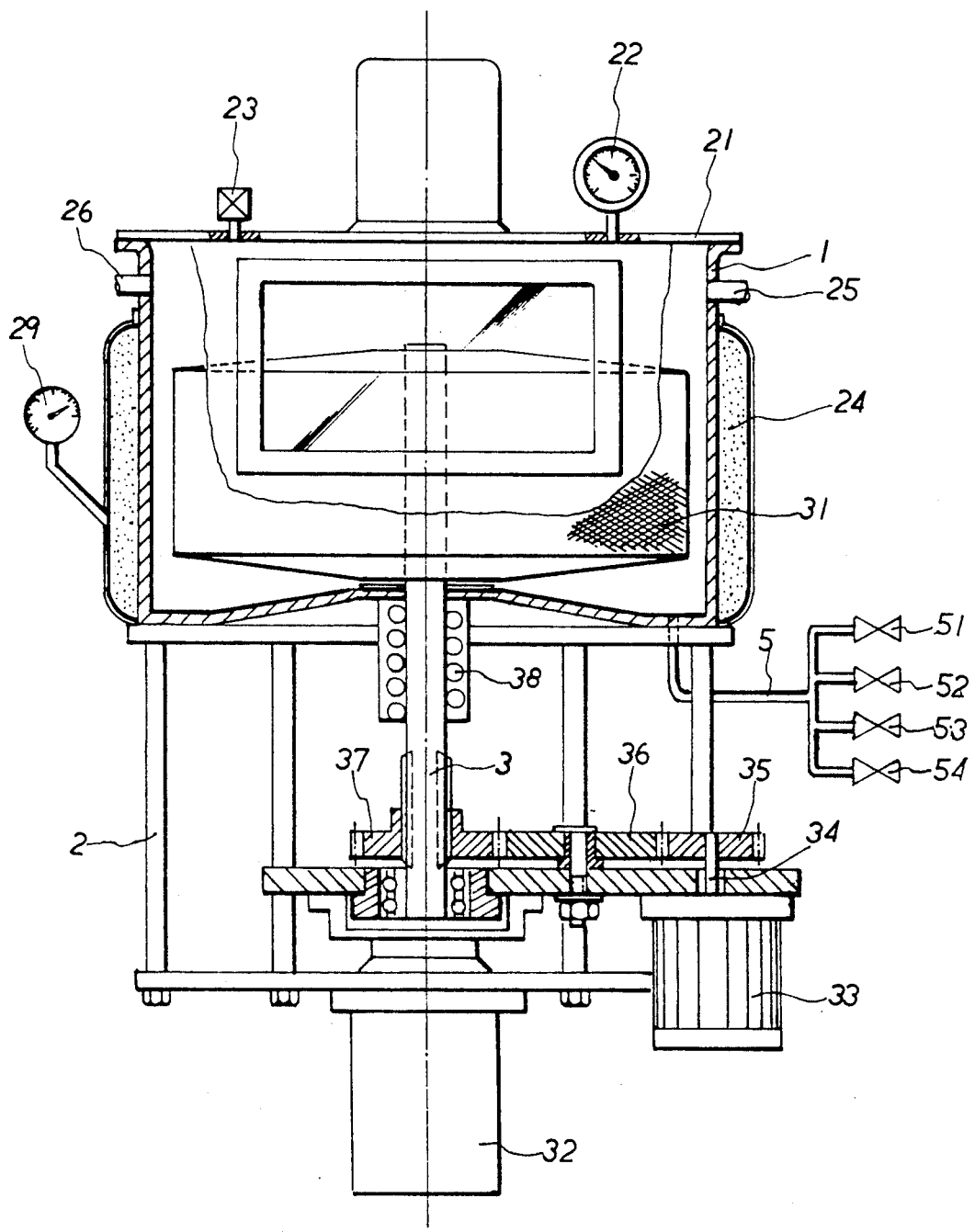
FIG. 1 is a diagram showing the first kind of the multi-purpose food processing apparatus of the present invention.

Referring to FIG. 1, the first type multi-purpose food processing apparatus comprises a U-shaped frying pan 1 supported by a bracket 2 and having a top lid 21 which is equipped with a pressure gauge 22 and a release valve 23; and an external covering 24 encompassing the outer surface of the frying pan 1 with a space defined therebetween so as to permit high temperature to circulate therein for heating of the frying pan 1; and a temperature gauge 29 in association with the external covering 24 for indication of the temperature of the steam; an air drawing duct 25 on one side and near the top of the frying pan 1; and a pressure exerting duct 26 disposed on the opposite side of the air drawing duct 25; a main shaft 3 going through the bulged bottom of the frying pan 1; and a meshy basket 31 secured to the main shaft 3; and a pneumatically operated cylinder 32 associating with the bottom end of the main shaft 3 ; and a motor 33 having an output shaft 34 which is Provided with a drive gear 35 in engagement with an idle gear 36 that is in mesh with a gear 37 secured to the main shaft 3; and a bearing 38 disposed under the bottom of the frying pan 1 and in association with the main shaft 3; and a main infusing duct 5 disposed under the bottom of the frying pan 1 being in communication with a soakage fluid infuser 51, an oil infuser 52, a blanching fluid infuser 53 and a fluid recollection duct 54 that are controlled by a valve respectively so that various kinds of fluid or oil can be selectively filled into the frying pan 1 as desired in the process.

In the practical operation, there are a number of procedures can be selected in application to various kinds of food according to the specific properties thereof, in which:

A blanching process is applied to food so as to sabotage the proteins thereof, permitting the food to be easily preserved wherein the blanching fluid is filled into the frying pan 1, via the main infusing duct 5 from the blanching fluid infused 53 to a proper level; in the meanwhile, the pneumatically operated cylinder 32 in connection to the main shaft 3 actuates the same to move up and down, and the motor 33 having a drive gear 35 which is in mesh with the idle gear 36 actuates the gear 37 secured to the main shaft 3 to spin, rendering the shaft 3 to spin continually in one particular direction; at the same time, heating steam is circulating around the frying pan 1 and the food received in a meshy basket is evenly boiled and blanched; afterwards, the steam is stopped with the blanching fluid discharged via the main infusing duct 5 and recollected by the infuser 53; the pneumatically operated cylinder 32 stops functioning to terminate the up and down operation of the main shaft 3; simultaneously the motor is spinned at a high speed to separate the blanching fluid from the processed food.

A soaking process is taken after the blanching process; wherein soaking fluid is filled into the frying pan 1 via the main infusing duct 5 from the soaking fluid infuser 51, with the temperature thereof checked so as to determine if heat is supplied or not; afterwards, the pneumatically operated cylinder 32 along with the motor 33 is actuated to produce an up and down and spinning motion so as to make the soakage evenly effected; in the meanwhile, pressure is reciprocally applied and removed by way of the pressure exerting duct 26 and the air drawing duct 25 so that the processed food can be handled in the same manner as the squeezing of a sponge by a hand, with the soakage time greatly shortened; at the end of the soaking process, the soaking fluid is discharged via the main infusing duct 5 into the infuser 51, and all the above cited operations are stopped with the speed of the motor 33 increased so as to make the processed food dehydrated.

A frying process follows the soaking process wherein the frying oil is filled into the frying pan 1 by way of the main infusing duct 5 from the oil infuser 52 with heating steam supplied to the frying pan 1 to increase the temperature thereof; in the meanwhile, the frying pan 1 is subjected only to a constant vacuum state with the meshy basket 31 moved up and down and spinned continually so that the processed food can be evenly and effectively fried as a result of the vacuum state making the skins of the processed food split with the frying oil easily penetrating thereinto so as to shorten the frying time, preventing the processed food from being scorched by deep frying; afterwards, the frying oil is recollected via the main infusing duct 5 by the oil infuser 53; then a reciprocally pressurized and vacuumized state is applied to the frying pan 1 with the speed of the motor 33 increased so as to effectively make the processed food de-oiled; the reciprocally vacuumized and pressurized state make the oil in the processed food easily squeezed out and separated therefrom by way of the centrifugal force applied thereto as a result of high speed of rotation of the meshy basket so as to make the oil containing of the processed food conforms to an internationally accepted standard.

Figure 3:
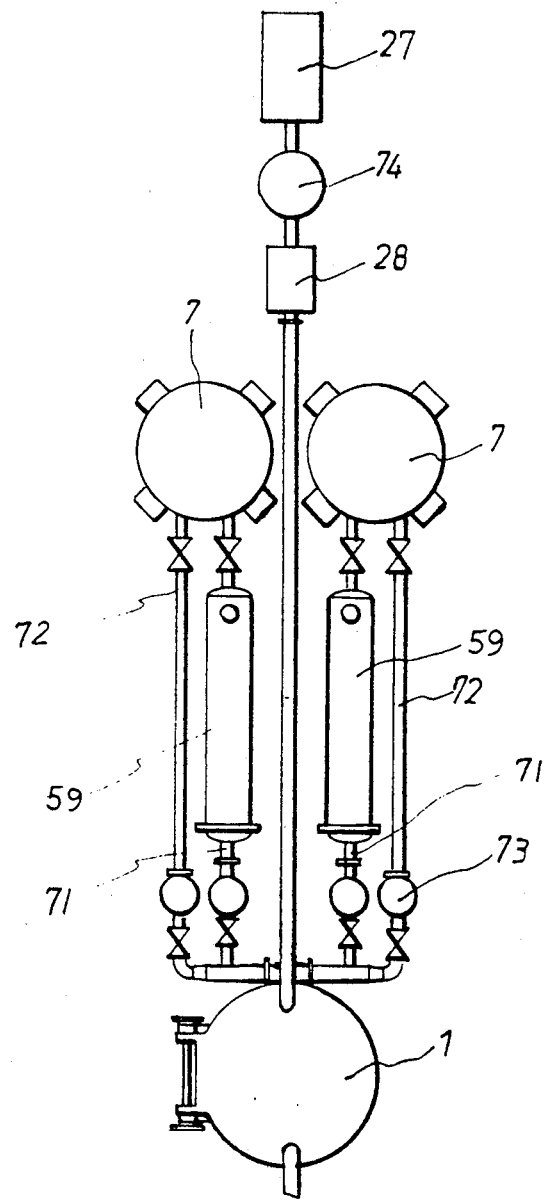
FIG. 3 is a diagram showing the arrangement of the reservoirs and the corresponding ducts thereof.

Referring to FIG. 3, there are a number of reservoirs 7 in connection to the frying pan 1 which receives various kinds of fluid or oil for use in the processing of the food. Each reservoir 7 has an infusing duct 71 and a recycling duct 72 that are in selective communication with the frying pan with a control valve 73 disposed therebetween so that the necessary fluid can be charged into the frying pan via the control valve 73 respectively. Each infusing duct 71 is equipped with an instant germicidal unit 59 for pasteurizing the fluid or oil passing therethrough. The air drawing duct 25 is connected to a vacuum pump 27 with a cooling device 28 and a vacuum auxiliary unit 74 disposed therebetween so as to make the air drawn by the vacuum pump 27 cooled before entering it, preventing the pump 27 from being damaged by heat.

Figure 2:
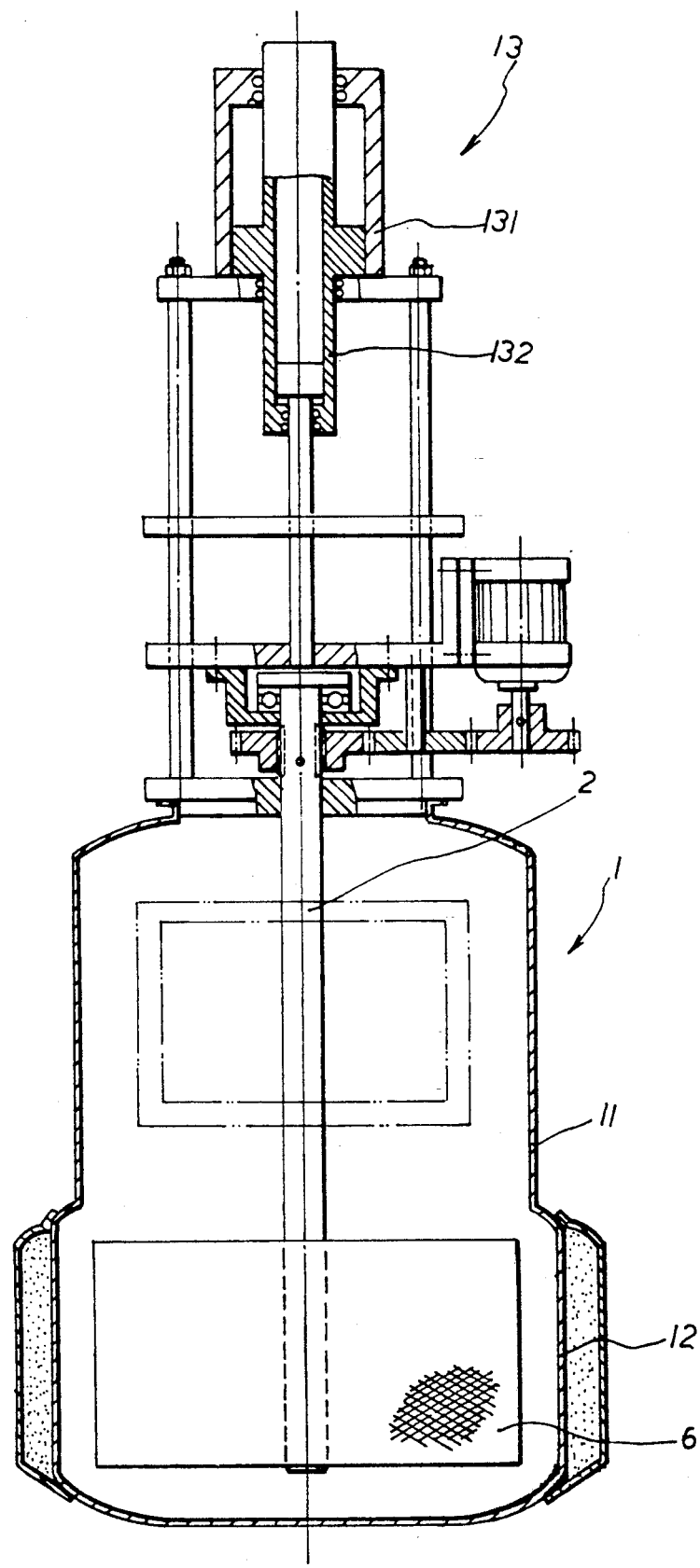
FIG. 2 is a diagram showing the second kind of the multi-purposes food processing apparatus of the present invention.

Referring to FIG. 2, a second embodiment of the present invention has mostly the same structure as the first embodiment with only some minor modifications made which will be explained as below:

The frying pan 1 of the second embodiment is twice as large as that of the first embodiment and comprises an upper portion 11 and a lower portion 12. The lower portion 12 accommodates various kinds of fluid or oil used for blanching, soaking, and frying the food. The top end of the main shaft 2 is connected to a composite pneumatic cylinder 13 which is made up of a major cylinder 131 and a minor cylinder 132. The stroke of the composite pneumatic cylinder 13 is just enough to lift the meshy basket 6 away from the fluid disposed in the lower portion 12 of the frying pan 1 and locate the same in the upper portion 11 for dehydration; and the fluid or oil can be recollected in the lower portion 12 of the frying pan 1. Moreover, the temperature of the heating steam can be controllably varied so that the fried food can be completely fried in the first stage and then de-oiled when the meshy basket 6 is lifted up and spinned; afterwards, the de-oiled food can be plunged into the frying oil again which has been heated by the steam to a boiling point for a proper length of time thereby the food becomes crispy outside and well done inside.

It becomes apparent that the present invention applies a reciprocally vacuumized and pressurized state to the frying pan so as to subject the processed food to a swelling and squeezing operation in a reciprocating manner thereby the food can be effectively soaked; and the up and down motion by means of the pneumatically operated cylinder and the rotation by way of the motor of the meshy basket make the processed food more evenly soaked with the operation time thereof greatly saved; and the use of the composite cylinder in the second embodiment enables the operation time effectively reduced and specially flavored food can be produced thereby. Moreover, the reciprocally pressurized and vacuumized operation in the present invention greatly helps the processed food de-oiled so that the oil contained in the processed food can conform to an internationally accepted standard.

I claim:

1. A reciprocally vacuumized and pressurized multipurpose food processing apparatus, comprising:
- a frying pan having a lid disposed on the top thereof being supported by a bracket;
- a pressure gauge and a release valve being disposed on top of said lid and in operational communication with said frying pan;
- an external covering air tightly encompassing the outer surface of said frying pan with a space defined therebetween with a temperature gauge in association therewith so that heating steam can circulate therein and the temperature thereof monitored;
- an air drawing duct disposed in communication with said frying pan ;
- a pressure exerting duct disposed in communication with said frying pan;
- a vacuum pump in connection to said air drawing duct with a cooling device disposed therebetween;
- a main shaft led through the bottom of said frying pan being coupled to a pneumatically operated cylinder at the bottom end thereof and having a gear secured thereto which is driven by a motor via an idle gear so that said main shaft can be moved up and down and spinned at the same time;
- a meshy basket secured to said main shaft in which is received the food ready to be processed;
- a main infusing duct in communication with said frying pan which is in communication with a soaking fluid infuser, a blanching infuser, an oil infuser and a fluid recollection duct so that various kinds of fluid can be charged into said frying pan and recollected after use;
- a number of reservoirs each having an infusing duct and a recycling duct that are equipped with a control valve respectively; each said reservoir being coupled to said frying pan.

2. A reciprocally vacuumized and pressurized multipurpose food processing apparatus as claimed in claim 1 wherein each said infusing duct in communication with said frying pan and said reservoir is equipped with an instant, germicidal unit.

3. A reciprocally vacuumized and pressurized multipurpose processing apparatus as claimed in claim 1 wherein said frying pan has a size twice as large as the original one and is provided with an upper portion and a lower portion; and said main shaft is connected to a pneumatically operates composite cylinder which is made up of a major cylinder and a minor cylinder having a stroke enough to lift said meshy basket away from the fluid received in said lower portion of said frying pan and to plunge the same in said fluid received in said lower portion of said frying pan.

* * * * *